United States Patent [19]

Stillman

[11] Patent Number: 4,790,923
[45] Date of Patent: Dec. 13, 1988

[54] LIQUID TREATING ELECTROLYTIC CELL

[76] Inventor: Neil W. Stillman, 1062 N. 24th St., Mesa, Ariz. 85203

[21] Appl. No.: 70,813

[22] Filed: Jul. 7, 1987

[51] Int. Cl.$^4$ ............... C25B 1/24; C25B 9/02; C25B 15/08

[52] U.S. Cl. ............... 204/268; 204/271; 204/269

[58] Field of Search ............... 204/269, 271, 268, 149, 204/95

[56] References Cited

U.S. PATENT DOCUMENTS

| | | | |
|---|---|---|---|
| 3,458,415 | 7/1969 | Hughes, Jr. et al. | 204/149 |
| 3,835,020 | 9/1974 | Galneder | 204/268 |
| 3,893,902 | 7/1975 | Loftfield et al. | 204/275 X |
| 3,900,377 | 8/1975 | Enns et al. | 204/149 |
| 4,085,028 | 4/1978 | McCallum | 204/269 |
| 4,100,052 | 7/1978 | Stillman | 204/268 |
| 4,124,480 | 11/1978 | Stevenson | 204/268 |
| 4,194,953 | 3/1980 | Hatherly | 204/269 X |
| 4,312,827 | 2/1983 | Spaziante et al. | 204/95 |
| 4,436,605 | 3/1984 | Holca | 204/268 X |
| 4,568,440 | 2/1986 | Sutter et al. | 204/269 X |
| 4,714,534 | 12/1987 | Fair et al. | 204/271 X |

*Primary Examiner*—Donald R. Valentine
*Attorney, Agent, or Firm*—Cahill, Sutton & Thomas

[57] ABSTRACT

An electrolytic cell for producing a halogen biocide and oxygen in a liquid containing a halogen salt as the liquid is passed therethrough. The electrolytic cell contains a plurality of electrode plates which are mounted in spaced apart parallel relationship in the cell with less than all of the electrtode plates being connectable to a suitable power supply. The cell is configured so that the end edges of at least the electrode plates which are connectable to the power supply are encased in an electrically insulative chemically resistant material to prevent current leakage between those plates.

18 Claims, 4 Drawing Sheets

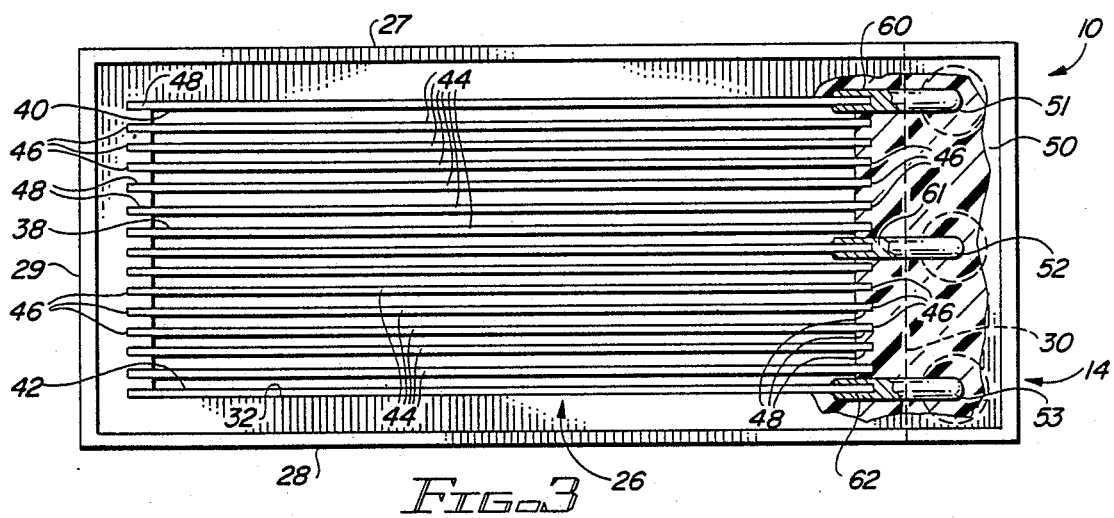
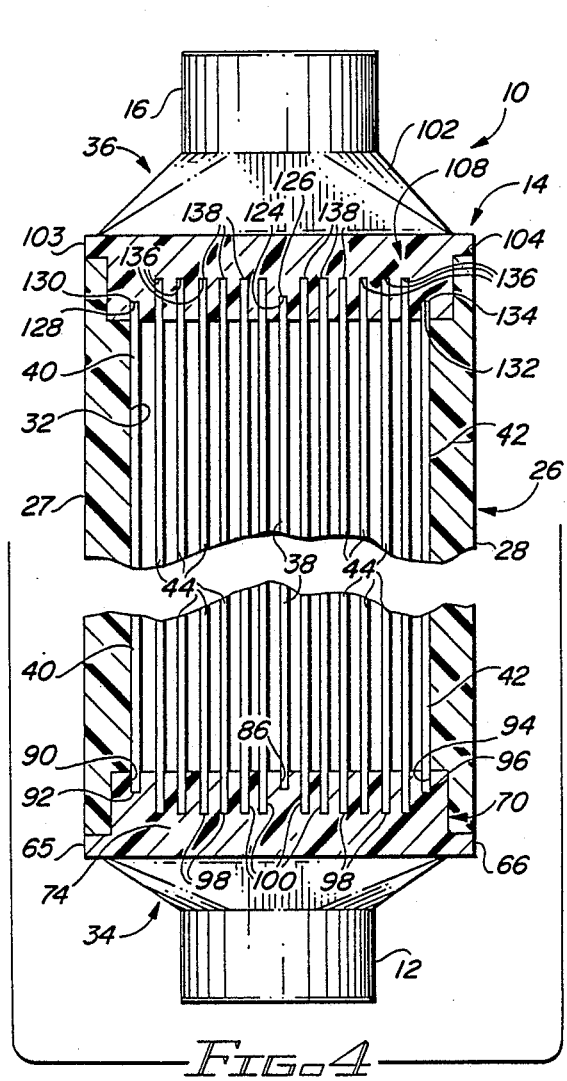
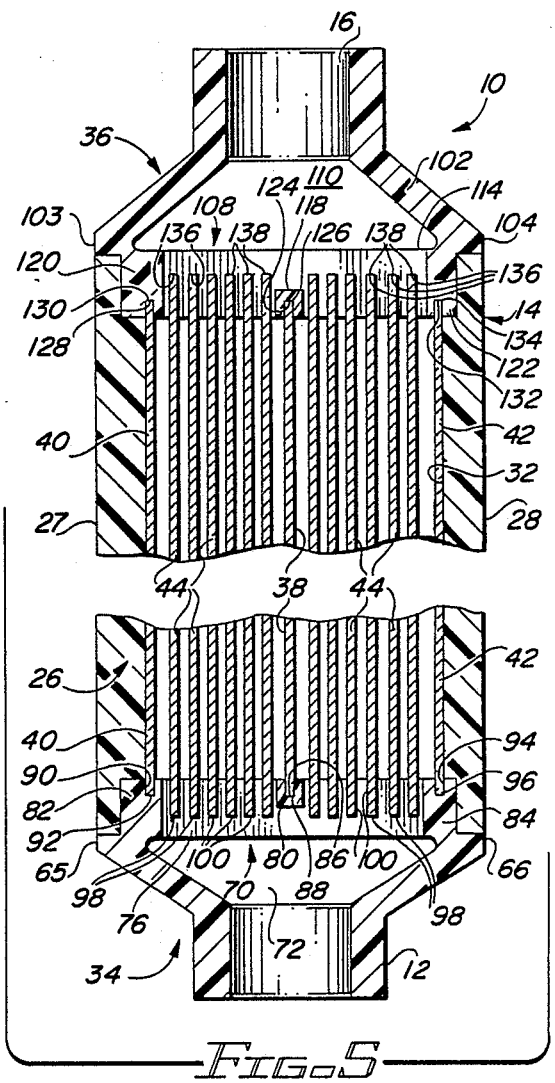

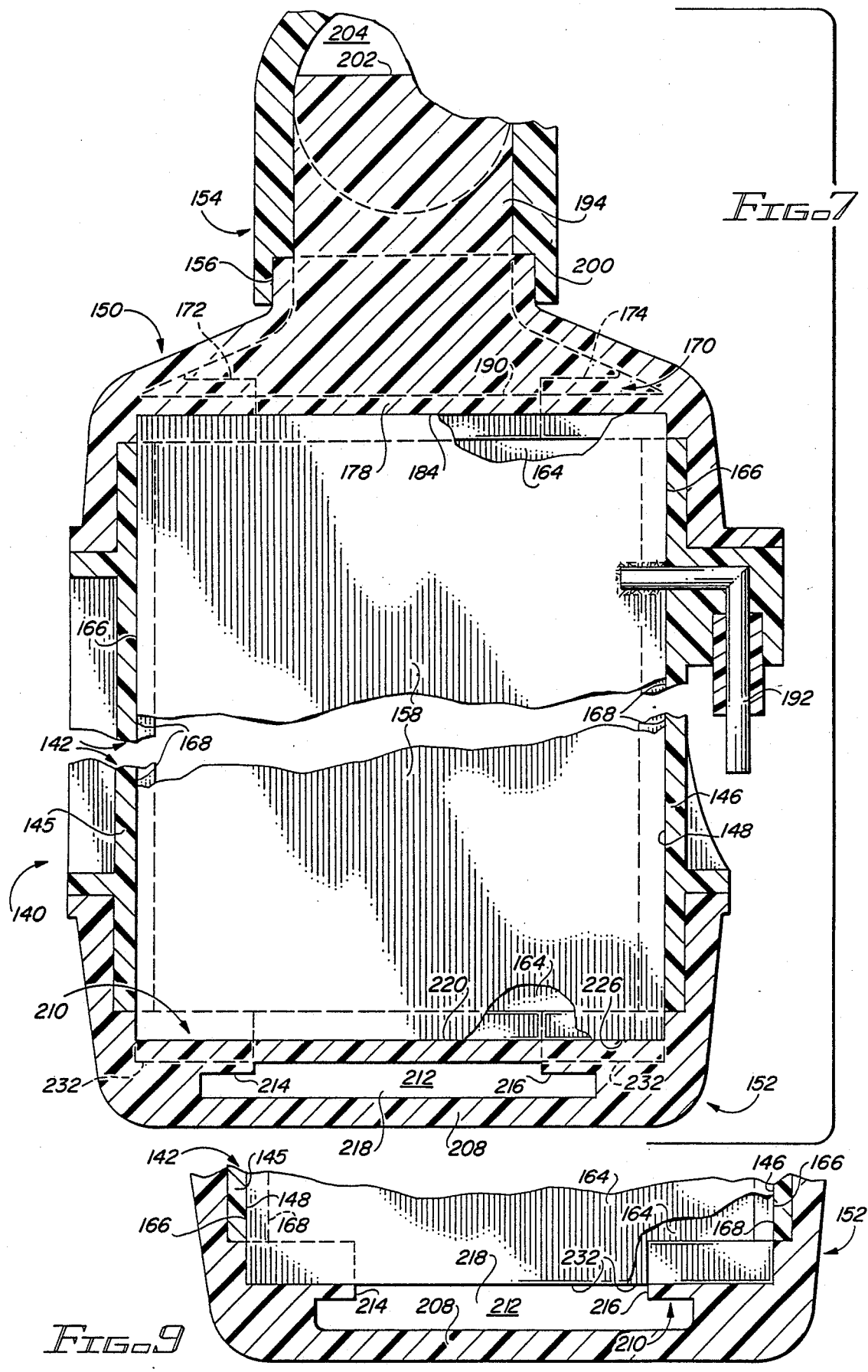

LIQUID TREATING ELECTROLYTIC CELL

BACKGROUND OF THE INVENTION

1. Field of the Invention

This invention relates in general to an electrolytic cell for generating halogen biocides and oxygen for liquid treatment, and more particularly to an improved electrolytic cell configuration for reduction of electrode plate deterioration.

2. Description of the Prior Art

Chlorine has been used extensively for a long time as a biocidally active agent for treating both non-potable liquids such as sewage, effluents, swimming pool water, spa water, cooling tower water, and potable water from wells, reservoirs and the like.

Chlorination has traditionally been accomplished by the addition of chemical compounds, such as a hypochlorite compound, to the liquid being treated. The addition of chemical compounds for producing the desired biocidal activity has become increasing costly due to the costs for purchasing the compounds. In relatively large installations, such as cooling towers, water condition sensing devices are used in conjunction with dispensing equipment for more or less automatic operation. Such devices and equipment are also very costly not only from a purchasing standpoint, but also from operating and maintaining standpoints. In relatively smaller installations such as many swimming pools and spas where atuomatic sensing and dispensing equipment cannot be economically justified, manual testing and compound dispensing must be done on a regular basis. However, due to busy schedules, forgetfullness and the like, manually accomplished water treatment is often neglected.

In addition, the storage and handling of such chemical compounds is dangerous, and it is very likely that increasingly stringent regulations will be imposed on the transporting of dangerous chemicals, and this will add to the costs of such products which are already expensive.

A solution to many of these problems is to employ and electrolytic cell for on-site production of a biocidally active agent at a reasonable cost, greater ecological acceptability and improved safety. An electrolytic cell produces a halogen biocide from an aqueous solution which contains a halogen salt, such as producing chlorine by electrolysis of water containing sodium chloride, such as sea water. However, all too often, cooling towers, swimming pools, wells and the like, are located in areas where only fresh water is available. In those areas, electrolytic generation of low levels of chlorine has been hampered by low current efficiencies in fresh water containing low levels of the chloride salt, and by excessive formation of scale on the cathode ot the electrolytic cell. One method for overcoming this is to utilize an aqueous solution having a high concentration of chloride salt for producing chlorine by electrolysis. The chlorine generated in this manner is mixed with a suitable carrier liquid, and then in turn, added to the liquid being treated. While the current efficiencies in the cells used in accordance with this method are good, the mechanism used for safely mixing the chlorine, or other biocidally active agent with the carrier liquid are complex and have become increasingly expensive. Due to the complexity of the equipment, extra handling of the biocidally active agent and the like, the use of this method has exhibited poor field performance.

For the above reasons, I devised an electrolytic cell for direct generation of a halogen biocide from solutions containing very low concentrations of halogen salts. My cell, which is fully disclosed in U.S. Pat. Nos. 4,100,152 and 4,202,738, is manufactured at commercially feasible prices for low-cost onside generation of halogen biocides directly from the aqueous solutions which are passed through the cell. This special electrolytic cell includes a plurality of planar electrode plates which are provided with special surface coatings and are arranged in spaced apart parallel relationship with respect to each other within an enclosure through which the solution to be treated is passed. Electric connection is made from a suitable power source to a centrally located one of the electrode plates and to each of the outermost and oppositely located electrode plates. These electrode plates which are connected to the power source are referred to as the primary electrode plates, and the other plates which are located between the primary electrode plates are not connected to the power source and are commonly referred to in the art as bipolar electrode plates.

Although the above mentioned U.S. Patents describe the electrolytic cell operation as having ionic current flow therethrough in a fixed direction with cell operation being intermittent for electrode plate cleaning purposes, it was found that periodically reversing the polarity of the primary electrode piates worked better for plate cleaning purposes. Even so, the electrolytic cell must be removed from the solution moving system from time to time to remove scale deposits which build up rather rapidly particularly at the exposed end edges of the primary electrode plates. Although the need for removal of the cell from the solution moving system is less than ideal, the major problem is electrode deterioration which takes place in the same areas where excessive scaling occurs.

Due to the hostile environment in which the electrolytic cell operates and the rather stringent plate mounting requirements, the cells must be manufactured in a way which makes it virtually impossible, at least at an on-site location, to replace one or more deteriorated electrode plates. Therefore, even though these electrolytic cells have significant benefits from cost, convenience, safety and other standpoints, in comparison to the other herebefore described devices and methods, the electrolytic cell must be removed and cleaned more frequently than is desirable, and the entire cell must be replaced at intervals which are less than ideal.

Therefore, a need exists for a new and improved electrolytic cell which overcomes, or at least substantially reduces the scaling and electrode plate deterioration problems of the prior art.

SUMMARY OF THE INVENTION

In accordance with the present invention, a new and improved electrolytic cell is disclosed for generating halogen biocides and oxygen directly from a solution containing a very low halogen salt concentration. The electrolytic cell is for mounting in the solution moving system, such as in the pumping system of a swimming pool, potable water reservoir or the like, for generating a halogen biocide and oxygen direction from the solution as it is moves through the cell, with the biocide and oxygen being dissolved into the moving solution. The electrolytic cell of the present invention is especially configured to eliminate, or at least reduce the excessive scaling and electrode deterioration associated with my prior art electrolytic cell.

As in my prior art electrolytic cell, the cell of the present invention includes a plurality of planar electrode plates which are mounted in spaced apart parallel relationship with respect to each other within a housing so that the solution to be treated can flow through the spaces between the electrode plates. An electric field is created in the cell by connecting a suitable power source to substantially less than all of the electrode plates. Preferably, one connection is made to the centrally located one of the electrode plates and the other connection is made to each of the outermost electrode plats, with these plates being collectively referred to as the primary electrode plates. The other electrode plates which are disposed between the primary plates and are not connected directly to the power supply, are herein collectively referred as secondary electrode plates. Both the primary and secondary electrode plates are coated on both sides with an electrolytically conductive coating so that they can function as either cathode or anodes and are thus bipolar to allow current flow through the cell to be periodically reversed for electrode plate cleaning purposes.

When the solution containing a low concentration of a halogen salt, i.e. greater than 0.5 grams per liter, is moved through the electrolytic cell, the secondary electrode plates are ionically charged to transmit an ionic potential in reversible directions as determined by the polarity of the primary electrodes which, of course, determines the current flow direction through the cell, i.e. either toward the centrally located primary electrode plate or away from the central plate toward the outwardly disposed primary electrode plates. Current flow from the anode through the secondary electrode plates to the cathode produces an equal amount of chemical reaction at the anodic surfaces of each of the electrode plates.

As in all electrolytic cells, a carbonate scale forms on the cathode surface of the electrodes as an inherent result of the electrolysis process, and that scale must be removed to maintain the electro-chemical efficiency of the cell and to maintain a free flow of the solution being treated through the cell. Scale removal, or plate cleaning is accomplished, as is known in the art, by reversal of the cell's polarity periodically during operation of the cell.

Theoretically when the electrolytic cell is operating in a first polarity mode wherein the centrally located primary electrode plate is acting as the anode and the two outer electrodes are cathodes, the current applied to the anode is split in half so that equal amounts flow through the secondary plates on either side of the central anode to the outwardly disposed cathodes. In the second polarity operational mode, exactly the opposite occurs, that is, half of the current is applied to each of the outwardly disposed anodes, and that current flow through the secondary plates to the centrally located cathode. In either case, each anodic surface of each of the electrode plates, i.e. both the secondary and the primary electrode plates, receive a current value which is one half of the total amperage.

However, I have discovered that in my prior art electrolytic cell, current leakage takes place around the exposed ends of the secondary plates from the anode(s) to the cathode(s) of the primary electrode plates as a result of current flow taking the path of least resistance. This current leakage around the secondary plate results in an increase in the amount, or density, of current which flows through the exposed end edges of the primary electrode plates. The current leakage causes a decrease in the overall efficiency of the electrolytic cell and contributes significantly to the need for periodically removing the cell from the solution moving system for electrode cleaning purposes, and severely reduces the useful life of the cell. With the increase in current flow density taking place at the exposed edges of the primary plats, a corresponding increase in electro-chemical reaction will take place at those edges. This results in two undesirable conditions within the cell. First, carbonate scaling at those edges of the primary plates is far beyond what it should be, thus requiring frequent cell removal and cleaning. Secondly, rapid chemical decomposition of the exposed edges of the primary plates takes place which reduces the useful life of the electrolytic cell.

To overcome the above described current leakage problem, I have devised two solutions with a preferred electrolytic cell configuration which incorporates both solutions. The first solution cells for an overall reduction in the lengths of the primary electrode plates so that the exposed end edges thereof are recessed relative to the edges of the secondary plates. This will increase the distance between the exposed edges of the primary plates and thereby increase the resistance to the point where it is equal to or greater than the resistance through the secondary plates. The second solution involves the use of chemically resistant and electrically insulative cap means which are preferably formed integrally with the housing so as to cover the otherwise exposed end edges of the primary electrode plates in a manner where little or no additional impediment to the flow of the solution to be treated through the electrolytic cell is added.

In a first embodiment of the present invention, the electroylytic cell is configured for in-line installation in the solution moving system so that all of the solution being moved will pass straight through the electrolytic cell in what may be described as a full flow solution treatment operation. In a second embodiment, the electrolytic cell is configured for off-line connection to the solution moving system for diverting a portion of the solution for movement through the cell in a looplike flow path back into the solution moving system for what may be described as a by-pass solution treatment operation.

Accordingly, it is an object of the present invention to provide a new and useful electrolytic cell for generating a halogen biocide and oxygen directly from a solution containing a low level halogen salt concentration, with the cell having improved efficiency, minimized electrode scaling and chemical decomposition.

Another object of the present invention is to provide a new and improved bipolar electrolytic cell of the above described character which includes a plurality of electrode plates with selected ones being connected to a suitable power source to establish an electric field in the cell for electrolytic generation of a halogen biocide and oxygen in a solution moving therethrough, with the electrolytic cell having means for preventing current leakage between the selected electrode plates for improving cell efficiency, minimizing cell cleaning requirements and prolonging the useful life thereof.

Another object of the present invention is to provide a new and improved bipolar electrolytic cell of the above described type wherein the plurality of electrode plates are arranged in spaced apart parallel relationship within a housing with the central and two outermost electrode plates being connected to the power supply and having other non-connected electrode plates disposed therebetween, the exposed edges of the central and outermost pair of electrode plates being recessed relative to the edges of the non-connected electrode plates to prevent current leakage between the edges of the central and outermost pair of electrode plates.

Another object of the present invention is to provide a new and improved electrolytic cell of the above described character wherein the plurality of electrode plates are arranged in spaced apart parallel relationship within a housing with the central and two outermost electrode plates being connected to the power supply and having other non-connected electrode plates disposed therebetween, all of the edges of the central and outermost pair of electrodes are encased in chemically resistant and electrically insulative materials to prevent current leakage between the edges of the central and outermost pair of electrode plates.

Still another object of the present invention is to provide a new and improved electrolytic cell of the above described character which is configured for in-line installation in a solution moving system so that all of the solution being moved will be passed straight through the cell for full-flow solution treatment.

Yet another object of the present invention is to provide a new and improved electrolytic cell of the above described character which is configured for off-line connection to a solution moving system for diverting some of the moving solution into the cell for movement therethrough in a loop-type flow path back into the solution moving system for partial solution treatment.

The foregoing and other objects of the present invention as well as the invention itself, may be more fully understood from the following description when read in conjunction with the accompanying drawings.

BRIEF DESCRIPTION OF THE DRAWINGS

FIG. 3 is a top view of the electrolytic cell of FIG. 1 with the top removed and being partially broken away to show the various features thereof.

FIG. 4 is a sectional view taken along the line 4—4 of FIG. 2.

FIG. 5 is a sectional view taken along the line 5—5 of FIG. 2.

FIG. 7 is a fragmentary sectional view taken along the line 7—7 of FIG. 6.

FIG. 9 is a fragmentary sectional view taken along the line 9—9 of FIG. 6.

DESCRIPTION OF THE PREFERRED EMBODIMENT

Figure 1:
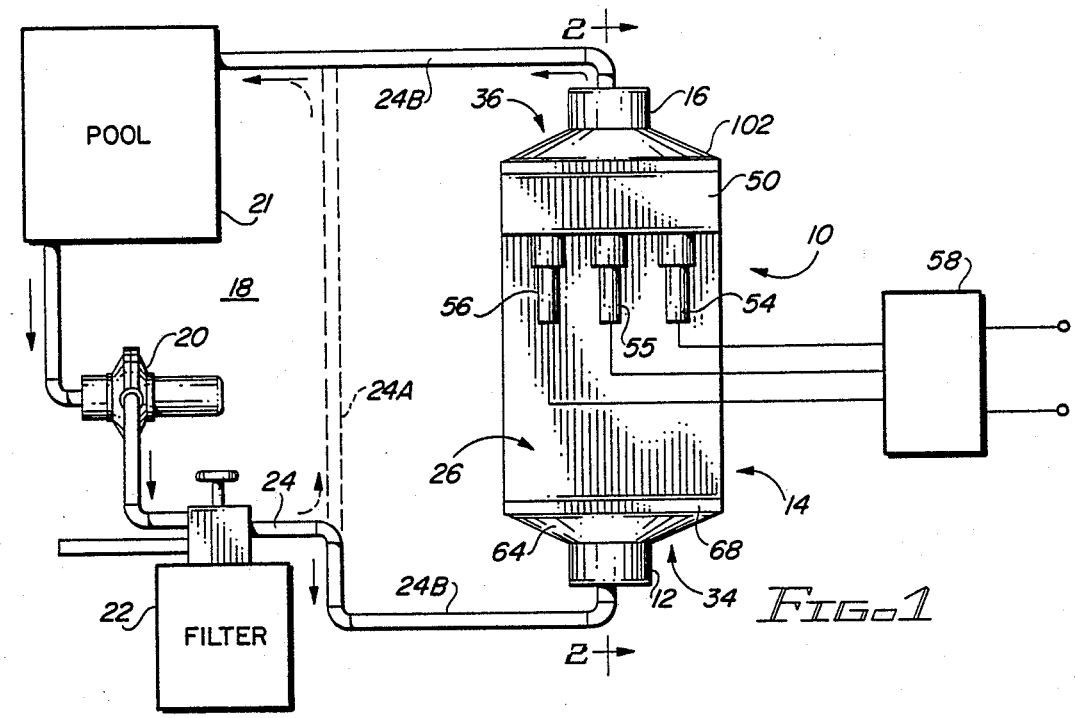
FIG. 1 is a diagrammatic illustration showing a first embodiment of the electrolytic cell of the present invention being mounted in a typical solution moving system.
Figure 2:
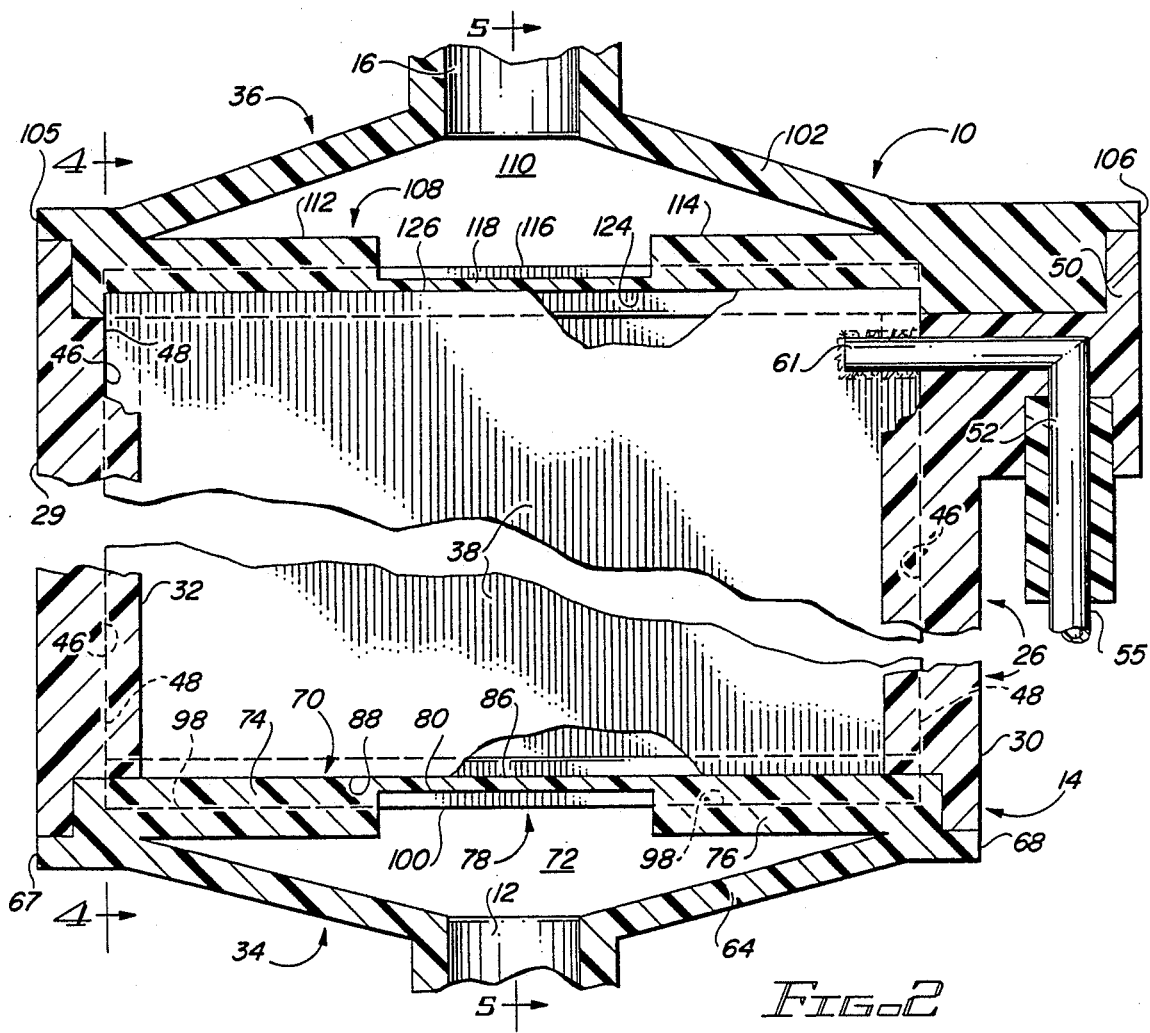
FIG. 2 is an enlarged fragmentary sectional view taken along the line 2—2 of FIG. 1.

Referring more particularly to the drawings, FIG. 1 shows an electrolytic cell of the present invention which is indicated in its entirety by the reference numeral 10. The electrolytic cell 10 is shown as having a solution inlet port 12 on one end of its housing 14 and a solution outlet port 16 on its opposite end. For reasons which will become apparent as this description progresses, the electrolytic cell 10 is designed for in-line mounting in a solution moving system such as the swimming pool filtering system 18 shown diagrammatically in FIG. 1.

As is well known, a swimming pool filtering system 18, typically includes a motor driven pump 20 for extracting water from a pool 21 and directing it under pressure to a suitable filter assembly 22. The filter assembly 22 is provided with a filtered water outlet conduit 24 and the electrolytic cell 10 is shown as being mounted in-line within the outlet conduit 24. In this manner all of the filtered water under pressure which is moved by the system 18 will pass through the cell 10 for fullflow treatment purposes as will hereinafter be described in detail. An alternate cell mounting arrangement is indicated in dashed lines in FIG. 1 wherein the filtered water conduit 24 is provided with a first branch 24A that is coupled directly from the outlet of the filter assembly 22 back to the swimming pool 21 and a by-pass conduit branch 24B in which the electrolytic cell 10 is mounted. In this alternate mounting arrangement, the cell 10 will treat a by-passed portion of the solution being moved by the system.

As mentioned above, the electrolytic cell 10 is designed for use in a solution moving system, and the above briefly described swimming pool system 18 is intended solely as being indicative of such systems. and is not to be construed as a limitation of the present invention. The electrolytic cell 10 can be used in virtually any solution moving system such as the pumping system of a sewage handling installation, potable water well or reservoir and the like.

As seen best in FIGS. 2 through 5, the housing 14 of the electrolytic cell 10 includes a cell body 26 having opposed sidewalls 27 and 28 and end walls 29 and 30 which cooperatively define an open ended chamber 32 that extends through the cell body 26. A pair of similarly configured special end closures 34 and 36 are mounted on the otherwise open ends of the cell body 26, with the end closure 34 having the solution inlet port 12 of the housing formed integrally thereon and the end closure 36 having the solution outlet port 16 similarly formed thereon.

A plurality of planar bipolar electrode plates are mounted in the cell body 26 with a centrally located electrode plate 38 and an opposed pair of outwardly disposed electrode plates 40 and 42 being hereinafter referred to collectively as the primary electrode plates, with the rest of the electrode plates 44 being collectively referred to as the secondary electrode plates. As seen best in FIG. 3, the bipolar electrode plates 38, 40, 42 and 44 are mounted in spaced apart parallel relationship with each other so as to be disposed in the open ended chamber 32 of the cell body 26, so that the plates are coextensive with the solution flow path through the cell. The inwardly facing surfaces of the endwalls 29 and 30 of the cell body 26 are formed with a plurality of slots 46 therein for receiving the side edges 48 of the electrode plates 38, 40, 42 and 44. The slots are arranged in precisely spaced apart relationship and are sized to snugly receive the side edges of the electrode plates. This insures equal spacing between the plates and a rigid mounting thereof. It is preferred that the side edges of he plates be fixedly mounted in their respective slots by using a suitable adhesive and sealing compound such as silicone.

The cell body 26 further includes a projecting ledge 50 in which electrically conductive bars 51, 52 and 53 are embedded. The distal ends 54, 55 and 56 of the conductive bars 51, 52 and 53 depend from the ledge 50 and serve as terminals for connection to a suitable power source 58 as indicated in FIG. 1. The proximal end 60 of the conductive bar 51 is connected, such as by welding, to the primary electrode plate 40, and the proximal ends 61 and 62 of the conductive bars 52 and 53 respectively, are similarly connected to the primary electrode plates 38 and 42.

The special end closure 34 located at the inlet end of the electrolytic cell 10 includes an end wall 64 having the inlet port 12 formed integrally at the center thereof. The peripheral edge of the end closure body 34 is formed to match the open end of the cell body 26 and has an opposed pair of elongated side edges 65 and 66 and an opposed pair of end edges 67 and 68. An especially configured cap plate 70 is provided on the closure body 34 so as to lie in a plane which is normal with respect to the axis of the inlet port 12 and is spaced therefrom to define an inlet chamber 72 between the end wall 64 and the cap plate 70. The cap plate 70 includes a pair of ledges 74 and 76 which extend toward each other from the end edges 67 and 68 of the closure body and define a central opening 78 therebetween. The ledges 74 and 76 are interconnected, as seen best in FIG. 5 by a central rib 80 which spans and bisects the opening 78 and an opposed pair of side ribs 82 and 84 which define the sides of the central opening 78. A first upwardly opening linear slot 86 is formed centrally in the cap plate 70, i.e. the slot 86 is cooperatively defined by the ledges 74 and 76 and by the central rib 80, and the bottom edge 88 of the central primary electrode 38 is located in that slot 86. A second upwardly opening linear slot 90 is cooperatively defined by the ledges 74 and 76 and the side rib 82 for receiving and covering the bottom edge 92 of the outwardly disposed primary electrode plate 40. A third upwardly opening slot 94 is cooperatively defined by the ledges 74 and 76 and the other side rib 84 and the bottom edge 96 of the other outwardly disposed primary electrode plate 42 is disposed therein. The ledges 74 and 76 are further provided with a plurality of upwardly opening slots 98 for receiving end portions of the bottom edges 100 of the secondary electrode plates 44 therein with the central portions of those edges 100 being exposed within the central opening 78 of the cap plate 70.

The opposite end closure 36 is similar to the above end closure 34 and has an end wall 102 with the outlet port 16 formed centrally therein. The peripheral edge of the closure body 36 has an opposed pair of elongated side edges 103 and 104 and an opposed pair of end edges 105 and 106. A cap plate 108 is provided on the closure body 36 so as to lie in a plane which is normal to the axis of the outlet port 16 and is spaced therefrom to define an outlet chamber 110 between the end wall 102 and the cap plate 108. The cap plate 108 includes a pair of ledges 112 and 114 which extend toward each other from the end edges 105 and 106 of the closure body 36 and define a central opening 116 therebetween. The ledges 112 and 114 are interconnected by a central rib 118 which spans and bisects the opening 116 and an opposed pair of side ribs 120 and 122 which define the opposed sides of the central opening 116 of the cap plate 108. A first downwardly opening linear slot 124 is formed centrally of the cap plate 108 so as to be cooperatively defined by the ledges 112 and 114 and by the central rib 118, and the top edge 126 of the centrally located primary electrode plate 38 is disposed in that first slot 124. A second downwardly opening linear slot 128 is cooperatively defined by the ledges 112 and 114 and the side rib 120 for receiving and covering the top edge 130 of the outwardly disposed primary electrode plate 40. A third downwardly opening slot 132 is cooperatively defined by the ledges 112 and 114 and by the opposite side rib 122 and the top edge 134 of the other outwardly disposed primary electrode plate 42 is disposed therein. The ledges 112 and 114 are also provided with a plurality of downwardly opening slots 136 for receiving end portions of the top edges 138 the secondary plates 44 with the central portions of those edges 138 being exposed in the central opening 116 of the cap plate 108. As was the case with the side edges of the electrode plates, the top and bottom edges thereof are preferably fixed in their respective slots by a suitable adhesive and sealant.

Although the physical characteristics of the materials from which the various components of the electrolytic cell 10 are made, are well known in the electrolysis art, a brief description will now be presented for completeness of this disclosure. The cell body 26 and the end closures 34 and 36 which form the cell housing 14 can be molded or otherwise formed from any suitable chemically resistant and electrically insulative material such as polymethyl methacrylate, polyvinyl chloride, polypropylene and the like. The electrode plates 38, 40, and 44 may be fabricated from any suitable electrically conductive material such as molybdenum, titanium, tungsten and the like with the preferred material be titanium, and are coated with a suitable anodically active material such as those disclosed in U.S. Pat. Nos. 3,632,498 and 3,711,385.

As will be seen from the above detailed description of the electrolytic cell 10, an aqueous solution containing a relatively low level of halogen salt concentration will flow into the cell through the inlet port 12 and will pass through the central opening 78 formed in the cap plate 78 of the end closure 34. After passing the central opening 78, the solution will move through the spaces between each of the plates 38, 40, 42 and 44 where the solution is acted upon by the well known electrolysis process for generating a halogen biocide, such as chlorine, bromine and the like, and also generating oxygen. Upon generation of the halogen biocide and oxygen, they will be mixed and thus dissolved in the solution as it exits the electrolytic cell 10 and continues to move in the solution moving system.

All electrolytic cells must contain an anode and a cathode in order to function, and the electrolytic cell 10 of the present invention contains the hereinbefore described electrode plates 38, 40, 42 and 44, and those plates are bipolar. A bipolar electrode plate is defined as having one surface which acts as a cathode with the opposite surface acting as an anode. In the electrolytic cell 10, the polarity of the primary electrode plates 38, 40 and 42 is periodically reversed, such as by means of a timed switching device (not shown) in the power supply 58, for cleaning the carbonate scale off of the cathode surfaces which inherently forms thereon as a result of the electrolysis process. When the power supply 58 is operating so that the centrally located primary electrode plate 38 is acting as an anode and the outwardly disposed primary electrodes are acting as cathodes, both surfaces of the central plate 38 will be anodic as will the outwardly facing surfaces of each of the secondary electrode plates 44 as a result of ionic charging. The outwardly disposed primary electrode plates 40 and 42 will both be acting as cathodes, and the inwardly facing surfaces of each of the secondary electrode plates 44 will be acting as cathodes due to ionic charging. Thus, each adjacent pair of electrode plates forms an individual electrolytic cell, with the cell 10 being made up of a plurality of such individual cells. In the illustrated example, the electrolytic cell 10 has a total of fourteen individual cells, with it being understood that that number may be varied. When the polarity of the cell 10 is reversed, both surfaces of the central primary electrode plate 38 will be acting as cathodes and the outwardly facing surfaces of each secondary electrode plate will be cathodic. The outwardly disposed electrode plates 40 and 42 in this operational state will, of course, be acting as anodes and the inwardly facing surfaces of each of the secondary electrode plates 44 will be anodic due to ionic charging. Therefore, as a result of the polarity of the primary electrode plates 38, 40 and 42 being reversible, the polarity of each individual cell is also reversible.

In that the outwardly facing surfaces of the outwardly disposed primary electrode plates 40 and 42 lack an adjacent electrode with which to react, it is preferred that those plates 40 and 42 be disposed in contiguous engagement with the sidewalls 27 and 28 respectively, so that the solution being moved through the cell 10 must pass through one of the individual cells and cannot avoid being subjected to the electrolysis process by passing between the electrode plates 40 and 42 and the sidewall 27 and 28 of the cell body 26.

In view of the above detailed description of the electrolytic cell 10, it will be seen that all of the edges of the primary electrodes 38, 40 and 42 are encased in an electrically insulative and chemically resistive material. Therefore, no current leakage between the edges of the primary electrode plates can occur in a manner which would reduce the ionic charging of the secondary electrode plates 44, produce concentrated current leakage flow paths that increase carbonate scaling and chemical deterioration of the electrode plates at the points of current leakage, as occurred in my prior electrolytic cell disclosed in the hereinbefore referenced U. S. Patents. As a result, the electrolytic cell 10 of the present has maximized efficiency, minimized scaling and maximum life expectancy due to elimination, or at least a substantial reduction in the chemical decomposition of the electrode plates.

Reference is now made to FIGS. 6 through 9 wherein a second embodiment of the electrolytic cell of the present invention is indicated in its entirety by the reference numeral 140. The cell 140 includes a body 142 having sidewalls 143 and 144 and end walls 145 and 146 which cooperatively define an open ended chamber 148 which extends through the cell body 142. End closures 150 and 152 are suitably mounted on opposite ends of the cell body 142. The end closure 152 is closed and the end closure 150 is connected to a special tee-fitting 154 that is used for connecting the electrolytic cell 140 to a conduit 155 of a solution moving system, such as the swimming pool filtering system 18 shown in FIG. 1. The end closure 150 has a port 156 formed thereon which serves as both a solution inlet and outlet for the cell 140, as will hereinafter be described in detail.

As in the above described electrolytic cell 10, the cell 140 includes a plurality of planar bipolar electrode plates including a central primary electrode plate 158 and a pair of outwardly disposed primary electrode plates 160 and 162, with the rest of the electrode plates being secondary electrode plates 164. Each of the electrode plates 158, 160, 162 and 164 have opposed side edges 166 which are disposed in slots 168 provided for that purpose in the end walls 145 and 146 of the cell body 142. This side edge mounting arrangement provides fixed spaced apart parallel mounting of the electrode plates 158, 160, 162 and 164 in the same manner as in cell 10.

The special end closure 150 includes a cap plate 170 which is similar to the cap plates 70 and 108 of the previous embodiment and thus includes a pair of ledges 172 and 174 which extend toward each other and define a central opening 176 therebetween. The ledges 172 and 174 are interconnected by a central rib 178 and a pair of opposed side ribs 180 and 182, with all these ribs extending across the central opening 176 of the cap plate 170. The ledges 172, 174 and the central rib 178 cooperatively define an inwardly opening slot in which the end edge 184 of the centrally located primary electrode plate 158 is disposed. The ledges 172 and 174 and the side rib 180 cooperatively define an inwardly opening slot in which the end edge 186 of the outwardly disposed primary electrode plate 160 is located. Similarly, the ledges 172 and 174 along with the other side rib 182 cooperatively define an inwardly opening slot in which the end edge 188 of the other outwardly disposed primary electrode plate 162 is located. The ledges 172 and 174 are also provided with a plurality of spacedly arranged inwardly opening slots in which the outwardly disposed portions of the end edges 188 of the secondary electrode plates 164 are located, with the central portions of those edges 190 of the secondary electrode plates 164 being exposed in the central opening 176 of the cap plate 170.

Although only one conductive bar 192 is shown in the drawings which depict this second embodiment of the cell of the present invention, it is to be understood that three such bars are provided in the same manner as the previously described cell 10.

Figure 6:
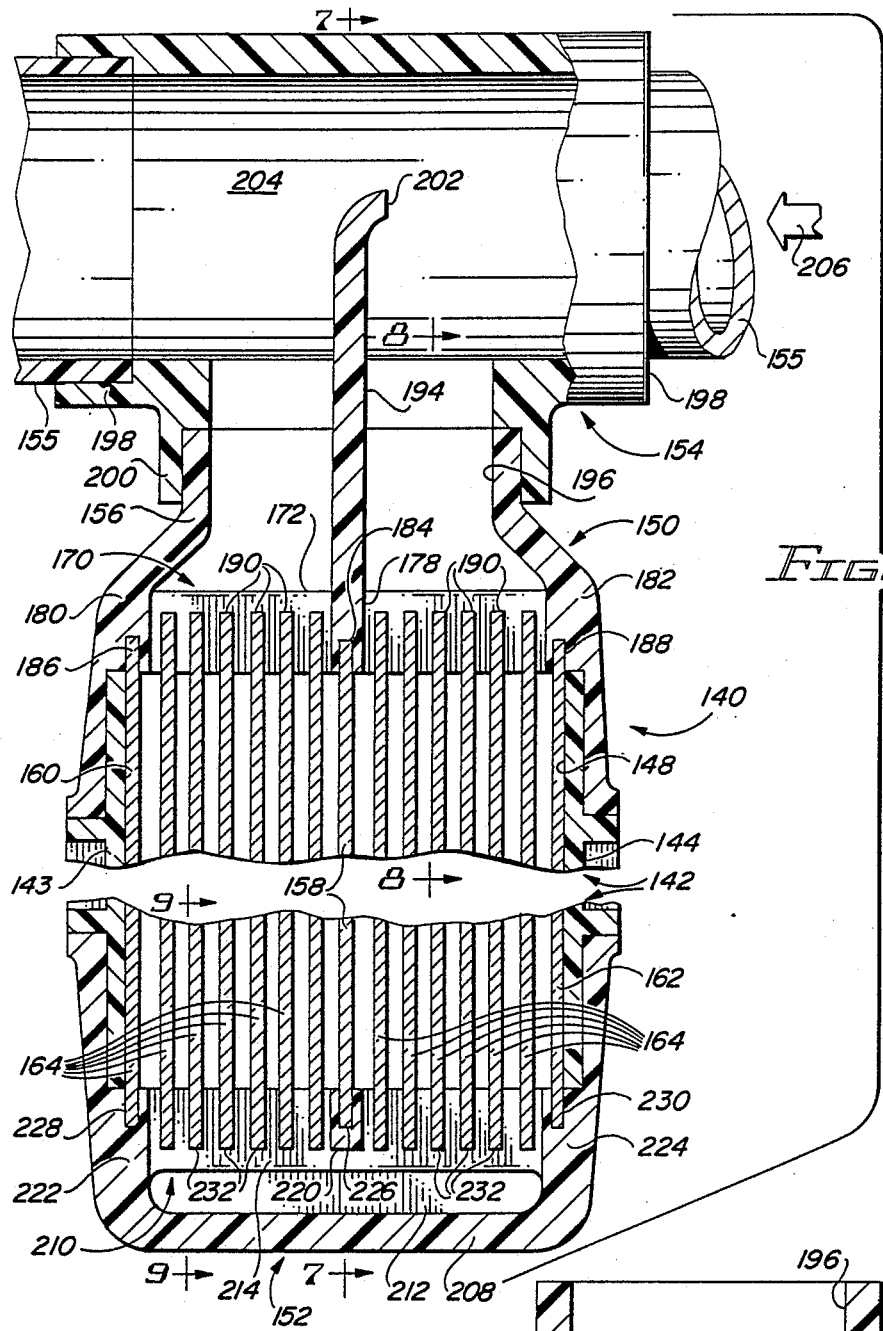
FIG. 6 is a fragmentary sectional view taken on a vertical plane through a second embodiment of the electrolytic cell of the present invention.
Figure 8:
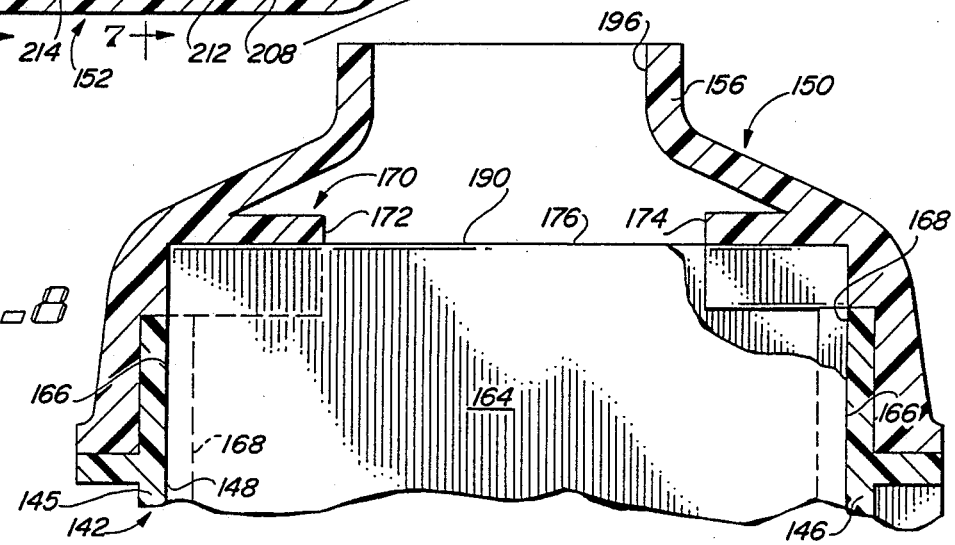
FIG. 8 is a fragmentary sectional view taken along the line 8—8 of FIG. 8.

As seen best in FIG. 6, the end closure 150 further includes a flow deflector plate 194 which extends normally from the center of the cap plate 170 so as to bisect the bore 196 of the port 156 and extend therefrom into the tee-fitting 154. The tee-fitting 154 is provided with an opposed pair of bosses 198 which are for mounting in the conduit 155 of the solution moving system as previously mentioned, and a normally extending boss 200 which is mounted on the port 156 of the end closure 150. The flow deflector plate 194 extends upwardly into the boss 200 of the tee-fitting 154 and is provided with a slightly curved upper end 202 which is disposed in the axial bore 204 defined by the opposed bosses 198 of the tee-fitting. The solution flow path through the conduit 155 is indicated by the arrow 206 and the upper end 202 of the flow deflector plate 194 is curved into the flow path so as to divert a portion of the moving solution into the electrolytic cell 140. Although the curved upper end 202 of the deflector plate 194 is shown as being located approximately on a diameter of the bore 204 of the fitting 154, it will be understood that its locations can be varied to suit the desired flow characteristics of the cell 140.

The other end closure 152 of the electrolytic cell 140 has an end wall 208 which is completely closed and a cap plate 210 which spaced therefrom to provide a chamber 212 in which the solution moving through the cell 140 will cross over from one side of the cell to the other end and reverse its flow direction, as will become more readily apparent as this description progresses.

The cap plate 210 of the end closure 152 includes a pair of ledges 214 and 216 which extend toward each other and define a central opening 218 therebetween. The ledges 214 and 216 are interconnected by a central rib 220 and an opposed pair of side ribs 222 and 224 which extend across the central opening 218 of the cap plate 210. The ledges 214 and 216 and the central rib 220 cooperatively define an inwardly opening slot in which the end edge 226 of the centrally located primary electrode plate 158 is disposed. The ledges 214 and 216 and the side rib 222 cooperatively define an inwardly opening slot in which the end edge 228 of the outwardly disposed primary electrode plate 160 is located. Similarly, the ledges 214 and 216 and the opposite side rib 224 cooperatively define an inwardly opening slot in which the end edge 230 of the other outwardly disposed primary electrode plate 162 is disposed. The ledges 214 and 216 are further provided with a plurality of spacedly arranged inwardly opening slots in which the opposite end portions of the end edges 232 of the secondary electrode plates 164 are located, with the central portions of the end edges 232 of those plates 164 being exposed in the central opening 218 of the end closure 152.

From the above, it will be seen that all of the edges of the primary electrode plates 158, 160 and 162 of the electrolytic cell 140 are encased in dielectric and chemically resistant material. Therefore, the electrolytic cell 140 prevents current leakage in the same manner as hereinbefore fully described with reference to the cell 10, and thus achieves the same objectives of improved efficiency, reduced maintenance and prolonged usefulness.

The solution flow path through the electrolytic cell 140 will be seen from the above description and the drawings, to be into the cell 140 on the right hand side, as viewed in FIG. 6, of the central primary electrode plate 158, so that the incoming solution will be subjected to electrolytic action by the individual electrolytic cells that are located on that side of the central primary electrode plate. The solution will cross over and reverse its direction upon entering into the chamber 212 of the end closure 152. Therefore, the solution being treated will flow back toward the conduit 155 of the solution moving system through the left hand side of the cell 140 and will thus be subjected to electrolytic action by the individual cell on the left hand side of the central primary electrode plate 158.

It will be noted that in both embodiments of the present invention, the end edges of the primary electrode plates are recessed relative to the end edges of the secondary electrode plates. Although this is not absolutely necessary, it is preferred to that if current leakage should occur, the leakage flow path would be increased in length, i.e. between the end edges of the primary electrode plates around the end edges of the secondary electrode plates. By increasing the length of a current leakage flow path, the resistance to such leakage is increased thus further decreasing the likelihood of current leakage. In view of this, it will be appreciated that recessed positioning of the end edges of the primary electrode plates will decrease the chances of current leakage even if the end edges of the primary electrode plates were not encased in the manner hereinbefore described. However, it is preferred that the end edges of the primary electrodes be both recessed and encased as shown and described herein.

While the principles of the invention have now been made clear in the illustrated embodiments, there will be immediately obvious to those skilled in the art, many modifications of structure, arrangements, proportions, the elements, materials and components used in the practice of the invention and otherwise, which are particularly adapted for specific environments and operation requirements without departing from those principles. The appended claims are therefore intended to cover and embrace any such modifications within the limits only of the true spirit and scope of the invention.

What I claim is:

1. An electrolytic cell for producing a halogen biocide in a liquid containing a halogen salt as the liquid is passed therethrough, said electrolytic cell comprising:
   (a) a cell body defining an open ended chamber which forms a flow path for the liquid;
   (b) a pair of end closure means each mounted on a different one of the open ends of said cell body;
   (c) port means on at least one of said pair of end closure means for passage of the liquid through said electrolytic cell;
   (d) a plurality of electrode plates each having an opposed pair of side edges and an opposed pair of end edges, said plurality of electrode plates being mounted in spaced apart parallel relationship in said cell body and coextensive with the flow path thereof;
   (e) conductor means for connection of less than all of said plurality of electrode plates to a power supply;
   (f) means for encasing the side edges of all of said plurality of electrode plates and the end edges of at least the ones of said plurality of electrode plates which are connectable to the power supply, said means for encasing including,
      I. said cell body having an opposed pair of end walls with a plurality of spacedly arranged parallel slots formed on the inwardly facing surfaces thereof for encasing the side edges of each of said plurality of electrode plates,
      II. each of said pair of end closure means including a cap plate for encasing the opposed end edges of the ones of said plurality of electrodes which are connectable to the power supply.

2. An electrolytic cell as claimed in claim 1 wherein said cap plates of said pair of end closure means are formed of an electrically insulative and chemically resistant material.

3. An electrolytic cell as claimed in claim 1 and further comprising:
   (a) said port means including a liquid inlet port formed on one of said pair of end closure means for admitting the liquid to said electrolytic cell; and
   (b) said port means including a liquid outlet port formed on the other one of said pair of end closure means for exiting of the liquid from said electrolytic cell.

4. An electrolytic cell as claimed in claim 1 wherein said plurality of electrode plates are arranged in said cell body with the opposed end edges of the ones of said plurality of electrode plates which are connectable to the power supply being recessed relative to the opposed end edges of the other ones of said plurality of electrode plates.

5. An electrolytic cell for producing a halogen biocide in a liquid containing a halogen salt as the liquid is passed therethrough, said electrolytic cell comprising:
   (a) a cell body defining an open ended chamber which forms a flow path for the liquid;
   (b) a pair of end closure means each mounted on a different one of the open ends of said cell body, a first one of said pair of end closure means having a closed end wall and defining a chamber;
   (c) a port means formed in the other one of said pair of end closure means for passage of the liquid through said electrolytic cell;
   (d) a plurality of electrode plates each having an opposed pair of side edges and an opposed pair of end edges, said plurality of electrode plates being mounted in spaced apart parallel relationship in said cell body and coextensive with the flow path thereof;
   (e) conductor means for connection of less than all of said plurality of electrode plates to a power supply;
   (f) means for encasing the side and end edges of at least the ones of said plurality of electrode plates which are connectable to the power supply; and
   (g) plate means for dividing said port means into a liquid inlet portion and a liquid outlet portion and for directing the flow of the liquid received from the inlet portion of said port means past some of said plurality of electrode plates into the chamber of said first one of said pair of end closure means and past the rest of said plurality of electrode plates to the outlet portion of said port means.

6. An electrolytic cell as claimed in claim 5 wherein said cell body comprises:
   (a) an opposed pair of side walls;
   (b) an opposed pair of end walls; and
   (c) means formed in the inwardly facing surfaces of said pair of end walls for encased mounting of the opposed side edges of each of said plurality of electrode plates.

7. An electrolytic cell as claimed in claim 6 and further comprising:
   (a) said cell body being formed of an electrically insulative and chemically resistant material; and
   (b) said means formed in the inwardly facing surfaces of said opposed pair of end walls being in the form of a plurality of spacedly arranged parallel slots.

8. An electrolytic cell as claimed in claim 5 wherein said means for encasing comprises:
   (a) said cell body having an opposed pair of end walls with a plurality of spacedly arranged parallel slots formed on the inwardly facing surfaces thereof for encasing the side edges of each of said plurality of electrode plates; and
   (b) each of said pair of end closure means including a cap plate for encasing the opposed end edges of the ones of said plurality of electrode plates which are connectable to the power supply.

9. An electrolytic cell for producing a halogen biocide in a liquid containing a halogen salt as the liquid is passed therethrough, said electrolytic cell comprising:
   (a) a cell body defining an open ended chamber which forms a flow path for the liquid, said cell body including an opposed pair of sidewalls and an opposed pair of end walls;
   (b) a pair of end closure means each mounted on a different open end of said cell body;
   (c) port means on at least one of said pair of end closure means for passing of the liquid through said electrolytic cell;
   (d) a multiplicity of electrode plates each having an opposed pair of side edges and an opposed pair of end edges, said electrode plates being mounted in spaced apart parallel relationship in said cell body and coextensive with the flow path thereof, said multiplicity of electrode plates including,
      I. a first primary electrode plate,
      II. a second primary electrode plate located on one side of said first primary electrode plate,
      III. a third primary electrode plate located on the opposite side of said first primary electrode plate,
      IV. a first plurality of secondary electrode plates located between said first and said second primary electrode plates,
      V. a second plurality of secondary electrode plates located between said first and said third primary electrode plates;
   (e) conductor means for connection of a power supply to said first, said second and said third primary electrodes;
   (f) said opposed pair of end walls of said cell body each having a multiplicity of slots formed in the inwardly facing surfaces for encasing the opposed side edges of each of said multiplicity of electrode plates; and
   (g) means for encasing the opposed end edges of said first, said second and said third primary electrodes.

10. An electrolytic cell as claimed in claim 9 wherein said means for encasing the opposed end edges of said first, said second and said third primary electrode plates comprises:
    (a) each of said end closure means includes a cap plate with each of said cap plates comprising,
       I. a central rib which extends along and overlays one of the end edges of said first primary electrode plate, said central rib having a slot in which the one end edge of said first primary electrode plate is encased,
       II. a first side rib which extends along and overlays one of the end edges of said second primary electrode plate, said first side rib having a slot in which the one end edge of said second primary electrode plate is encased, and
       III. a second side rib which extends along and overlays one of the end edges of said third primary electrode plate, said second side rib having a slot in which the one end edge of said third primary electrode plate is encased.

11. An electrolytic cell as claimed in claim 10 wherein said cap plate of each of said end closure means is formed of an electrically insulative and chemically resistant material.

12. An electrolytic cell as claimed in claim 9 wherein said means for encasing the opposed end edges of said first, said second and said third primary electrodes includes means for encasing the end portions of each of the opposed end edges of said first and said second pluralities of secondary electrode plates.

13. An electrolytic cell as claimed in claim 9 and further comprising:
    (a) each of said end closure means having a cap plate which lies in a plane which is transverse with the flow path through said cell body, each of said cap plates including, I. a pair of ledges defining a central opening therebetween, each of said pair of ledges having a multiplicity of slots formed therein, each of said multiplicity of slots being disposed for encasing an end portion of a different one of the end edges of said multiplicity of electrode plates, II. a central rib extending between said pair of ledges for overlaying the central portion of one of the end edges of said first primary electrode plate, said central rib having a slot for encasing the central portion of the one end edge of said first primary electrode plate, III. a first side rib extending between said pair of ledges for overlaying the central portion of one of the end edges of said second primary electrode plate, said first side rib having a slot for encasing the central portion of the one end edge of said second primary electrode plate, and IV. a second side rib extending between said pair of ledges for overlaying the central portion of one of the end edges of said third primary electrode plate, said second side rib having a slot for encasing the central portion of the one end edge of said third primary electrode.

14. An electrolytic cell as claimed in claim 9 and further comprising:
   (a) said port means including a liquid inlet port formed on one of said pair of end closure means; and
   (b) said port means including a liquid outlet port formed on the other one of said end closure means.

15. An electrolytic cell as claimed in claim 9 and further comprising:
   (a) a first one of said pair of end closure means having a closed end wall and defining a chamber;
   (b) said port means being formed on the other one of said pair of end closure means; and
   (c) plate means for dividing said port means into a liquid inlet portion and a liquid outlet portion and for directing the flow of the liquid receivable in the inlet portion of said port means through said first plurality of secondary electrode plates into the chamber of said first one of said pair of end closure means and through said second plurality of secondary electrode plates to the outlet portion of said port means.

16. An electrolytic cell as claimed in claim 9 and further comprising:
   (a) a first one of said pair of end closure means including a closed end wall and a cap plate which lies in a plane which is transverse to the flow path of said cell body, said cap plate being spaced from said closed end wall to define a chamber therebetween, said cap plate of said first one of said pair of end closure means including,
      I. a central rib having a slot in which one end edge of said first primary electrode plate is encased.
      II. a first side rib having a slot in which one end edge of said second primary electrode plate is encased,
      III. a second side rib having a slot in which one end edge of said third primary electrode plate is encased;
   (b) a second one of said pair of end closure means having said port means formed thereon and having a cap plate which lies in a plane transverse to the flow path of said cell body, said cap plate of said second one of said end closure means including,
      I. a central rib having a slot in which the other end edge of said first primary plate is encased,
      II. a first side rib having a slot in which the other end edge of said second primary electrode plate is encased,
      III. a second side rib having a slot in which the other end edge of said third primary electrode plate is encased;
   (c) a tee-fitting for mounting in a conduit of a liquid moving system, said tee-fitting including an axially aligned pair of bosses defining a liquid flow path and a normally extending boss which is coupled to said port means on said second one of said pair of end closure means; and
   (d) a flow deflector plate extending from said central rib of said cap plate of said second one of said pair of end closure means through said port means for bisecting thereof into a liquid inlet portion and a liquid outlet portion, said flow deflector plate extending from said port means through said normally extending boss of said tee-fitting at least part way into the liquid flow path defined by said axially aligned pair of bosses of said tee-fitting.

17. A electrolytic cell as claimed in claim 9 and further comprising:
   (a) said cell body having an opposed pair of side walls;
   (b) said second primary electrode plate having a planar surface which is in contiguous engagement with a first one of the opposed pair of side walls of said cell body; and
   (c) said third primary electrode plate having a planar surface which is in contiguous engagement with a second one of the opposed pair of side walls of said cell body.

18. An electrolytic cell as claimed in claim 9 wherein said multiplicity of electrode plates are arranged in said cell body so that the opposed end edges of said first, said second and said third primary electrode plates are recessed relative to the opposed end edges of said first and said second pluralities of secondary electrode plates

* * * * *